United States Patent
Doyon et al.

(10) Patent No.: US 12,033,450 B2
(45) Date of Patent: Jul. 9, 2024

(54) METHODS AND SYSTEMS FOR ACCESS CONTROL

(71) Applicant: GENETEC INC., Saint-Laurent (CA)

(72) Inventors: Jonathan Doyon, Saint-Laurent (CA); Mathieu Chevalier, Saint-Laurent (CA); Mortimer Hubin, Saint-Laurent (CA)

(73) Assignee: GENETEC INC., Saint-Laurent (CA)

( * ) Notice: Subject to any disclaimer, the term of this patent is extended or adjusted under 35 U.S.C. 154(b) by 24 days.

(21) Appl. No.: 17/824,172

(22) Filed: May 25, 2022

(65) Prior Publication Data

US 2022/0406111 A1 Dec. 22, 2022

Related U.S. Application Data

(60) Provisional application No. 63/213,115, filed on Jun. 21, 2021.

(51) Int. Cl.
*G07C 9/20* (2020.01)
*G06F 16/955* (2019.01)
*G07C 9/00* (2020.01)

(52) U.S. Cl.
CPC ......... *G07C 9/215* (2020.01); *G06F 16/9554* (2019.01); *G07C 9/00309* (2013.01); *G07C 9/00896* (2013.01)

(58) Field of Classification Search
None
See application file for complete search history.

(56) References Cited

U.S. PATENT DOCUMENTS 10,089,810 B1 * 10/2018 Kaye ................. G07C 9/00309
11,120,657 B2 * 9/2021 Ma ..................... G07C 9/00904
11,405,748 B2 * 8/2022 Kuenzi ............. H04M 1/72421

* cited by examiner

Primary Examiner — K. Wong

(57) ABSTRACT

A method of requesting access through a door may involve: causing a mobile computing device to receive an identifier of the door; and causing the mobile computing device to transmit an access request to an access-control system, the access request comprising data representing at least the identifier of the door and an access code. A method of controlling access through a door may involve: receiving an access request from a mobile computing device, the access request comprising data representing at least an identifier of the door and an access code; and in response to the request, allowing access through the door. Systems are also disclosed.

23 Claims, 8 Drawing Sheets

| Door Description | Identifier of Door | Identifier of Access Control Device | IP Address Range of Local Network |
|---|---|---|---|
| Description of door 116 | 3D5F230A | 204.25.241.87 | 204.25.*.* |
| Description of door 118 | 230G7B8E | 204.25.73.165 | 204.25.*.* |

METHODS AND SYSTEMS FOR ACCESS CONTROL

CROSS REFERENCE TO RELATED APPLICATION

This application claims the benefit under 35 USC 119(e) of U.S. Provisional Application Ser. No. 63/213,115, filed on Jun. 21, 2021, hereby incorporated by reference herein.

FIELD

This disclosure relates generally to access control.

RELATED ART

A user (such as an employee, contractor, student, guest, visitor, or other person) may request access through a door of a facility. For example, such a user may be provided with an access card (such as a radio-frequency identification (RFID) card, for example) that may allow access to some or all doors of the facility. However, such access cards may be misplaced, which may permit unauthorized use of the access cards. Further, administering such access cards can be time-consuming or costly.

SUMMARY

According to at least one embodiment, there is disclosed a method of requesting access through a door, the method comprising: causing a mobile computing device to receive an identifier of the door; and causing the mobile computing device to transmit an access request to an access-control system, the access request comprising data representing at least the identifier of the door and an access code.

In some embodiments, causing the mobile computing device to receive the identifier of the door comprises causing at least one camera of the mobile computing device to produce image data representing a visible door identifier of the door.

In some embodiments, the visible door identifier of the door comprises a Quick Response (QR) code.

In some embodiments, causing the mobile computing device to transmit the access request to the access-control system comprises causing the mobile computing device to transmit at least one hypertext transfer protocol (HTTP) signal.

In some embodiments, the method further comprises causing the mobile computing device to store the access code.

In some embodiments, causing the mobile computing device to store the access code comprises causing the mobile computing device to store the access code in an HTTP cookie.

In some embodiments, causing the mobile computing device to store the access code comprises causing the mobile computing device to store the access code in response to accessing a Uniform Resource Locator (URL).

According to at least one embodiment, there is disclosed a method of controlling access through a door, the method comprising: receiving an access request from a mobile computing device, the access request comprising data representing at least an identifier of the door and an access code; and in response to the request, allowing access through the door.

In some embodiments, receiving the access request comprises receiving the request in at least one HTTP signal.

According to at least one embodiment, there is disclosed an access-control computing system comprising at least one processor. The system further comprises at least one processor-readable storage device comprising stored thereon processor-executable instructions that, when executed by the at least one processor, cause the at least one processor to implement a method comprising: receiving an access request from a mobile computing device, the access request comprising data representing at least an identifier of the door and an access code; and in response to the request, allowing access through the door.

In some embodiments, the method further comprises transmitting the access code to the mobile computing device.

In some embodiments, transmitting the access code to the mobile computing device comprises transmitting the access code to the mobile computing device in at least one HTTP signal.

In some embodiments, the at least one HTTP signal comprises instructions to store the access code on the mobile computing device as an HTTP cookie.

In some embodiments, the method further comprises transmitting, to the mobile computing device, a URL operable to direct a web browser application of the mobile computing device to a webpage that causes the access-control computing system to transmit the at least one HTTP signal to the mobile computing device when the web browser application of the mobile computing device is directed to the webpage.

In some embodiments, transmitting the URL comprises causing a check-in kiosk to transmit the URL to the mobile computing device.

In some embodiments, transmitting the access code to the mobile computing device comprises transmitting the access code to the mobile computing device in response to user authentication on the mobile computing device.

In some embodiments, transmitting the access code to the mobile computing device comprises transmitting the access code to the mobile computing device in response to user authentication on the mobile computing device using an application that is restricted to sending requests for access codes to the access-control computing system.

In some embodiments, allowing access through the door comprises allowing access through the door in response to a determination that the access code is associated with access through the door.

In some embodiments, the access request further comprises data representing a security code, and allowing access through the door comprises allowing access through the door in response to a determination that the security code from the access request matches a security code that is generated by the access-control computing system and that changes over time according to a pseudorandom code generation function.

In some embodiments, allowing access through the door comprises allowing access through the door in response to a determination that the mobile computing device sent the access request using a local computer network associated with the door.

Other aspects and features will become apparent to those ordinarily skilled in the art upon review of the following description of illustrative embodiments in conjunction with the accompanying figures.

DETAILED DESCRIPTION

Figure 1:
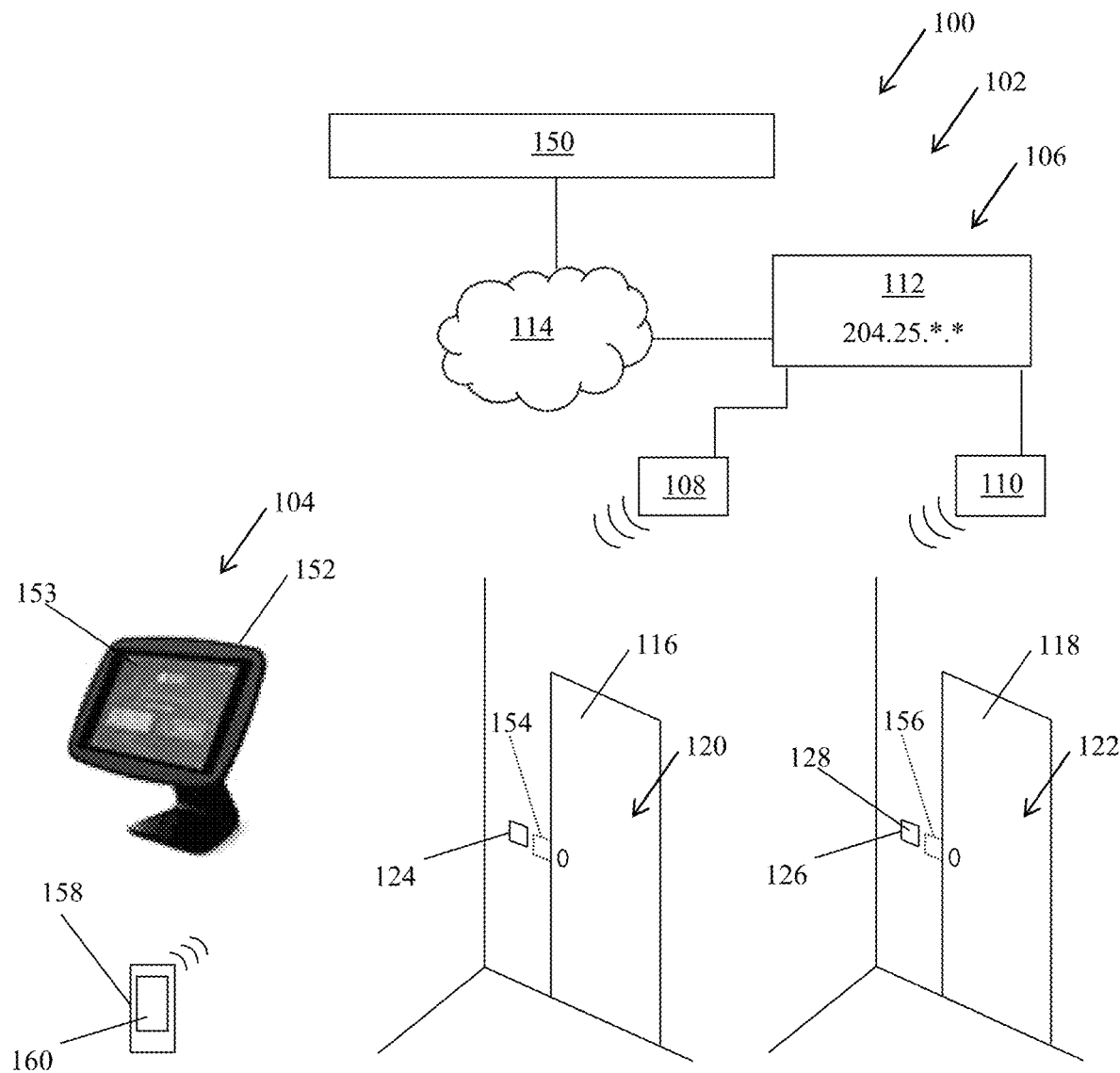
FIG. 1 schematically illustrates an access-control system according to one embodiment.

Referring to FIG. 1, an access-control system according to one embodiment is shown generally at 100 and is operable to control access at a facility according to one embodiment and shown generally at 102.

Facility

The facility 102 may include one or more workspaces, one or more office buildings, one or more factories, one or more research facilities, one or more educational facilities, a combination of two or more thereof, or any other building, set of multiple buildings, structure, set of multiple structures, or space where access control may be desired. The facility 102 includes a check-in location shown generally at 104. For example, the check-in location 104 may be a lobby, an entrance location, or another location where a guest, visitor, or other individual may enter the facility 102.

In the embodiment shown, the facility 102 also includes computer network shown generally at 106, such as a local-area network (LAN), for example. The computer network 106 includes a wireless-network access point 108. The computer network 106 also includes a wireless-network access point 110. The computer network 106 also includes a router 112 that may connect the wireless-network access points 108 and 110 to a computer network 114 such as the Internet, for example. The wireless-network access points 108 and 110 may be Wi-Fi access points or Wi-Fi routers, for example.

In some embodiments, any computing devices that transmit or receive signals using the computer network 106 (for example, by using the wireless-network access point 108 or 110) may have external (or public) Internet Protocol (IP) addresses within a range of IP addresses assigned by the router 112. For example, in the embodiment shown, the router 112 assigns external IP addresses between 204.25.0.0 and 204.25.255.255 to any computing devices that transmit or receive signals using the wireless-network access point 108 or 110, or otherwise using the router 112. Therefore, any computing devices that transmit or receive signals using the computer network 106 may be identifiable as computing devices using the computer network 106 according to their external (or public) IP addresses external to the computer network 106.

The facility 102 may also include doors 116 and 118. The doors 116 and 118 may be at different locations at the facility 102, for example in a same building or in different buildings of the facility 102. In the embodiment shown, the door 116 is within wireless communication range of the wireless-network access point 108, and the door 118 is within wireless communication range of the wireless-network access point 110, although alternative embodiments may differ.

The door 116 may control access through a doorway shown generally at 120 between a location on a first side of the doorway 120 and another location on a second side of the doorway 120 opposite the first side of the doorway 120. The door 118 may control access through a doorway shown generally at 122 between a location on a first side of the doorway 122 and another location on a second side of the doorway 122 opposite the first side of the doorway 122.

Of course the facility 102 is an example only, and alternative embodiments may differ. For example, some embodiments may omit the check-in location 104, or may include more than one check-in location. As another example, alternative embodiments may include more or fewer doors, and alternative embodiments may include different doors. Herein, "door" is not limited to the embodiments shown but may include any barrier that may move (by swinging or sliding, for example) or otherwise control access between locations on opposite sides of the barrier. As another example, alternative embodiments may include alternatives to the computer network 106 (such as alternatives that include more or fewer wireless-network access points or alternatives to the wireless-network access points 108 and 110, for example), or may omit the computer network 106.

Door Indicators

A door indicator 124 is near the door 116, and a door indicator 126 is near the door 118. A door indicator as described herein may be associated with a door. For example, in the embodiment shown, the door indicator 124 is associated with the door 116, and the door indicator 126 is associated with the door 118.

In some embodiments, a door indicator as described herein may bear or display a visible door identifier, for example a Quick Response (QR) code, which may be encoded with a Uniform Resource Locator (URL) including an identifier of the door associated with the door indicator. For example, in the embodiment shown, a QR code is printed or otherwise fixed on the door indicator 124 as shown in FIG. 2.

When an identifier of a door is included in a URL, for example, the identifier of the door may be a number or character string included in the URL and identifying the door. Therefore, a door indicator as described herein may indicate an identifier of the door associated with the door indicator, for example by bearing or displaying a QR code encoded with the identifier of the door associated with the door indicator.

Figure 2:
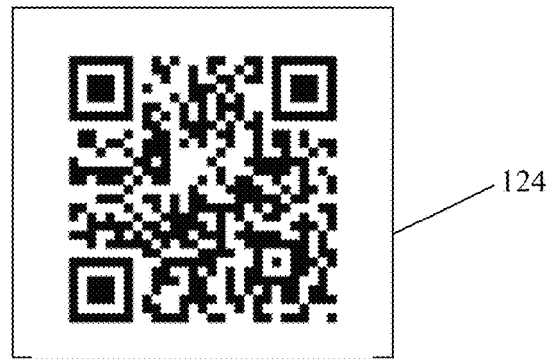
FIG. 2 illustrates a Quick Response (QR) code on a door indicator of the access-control system of FIG. 1.

In general, in some embodiments, such as the embodiment of FIG. 2 for example, a door indicator as described herein may bear a fixed QR code or another visible door identifier (such as a barcode, for example), such as one or more symbols or one or more shapes, for example, printed or otherwise fixed on the door indicator. However, alternative embodiments may differ.

Figure 3:
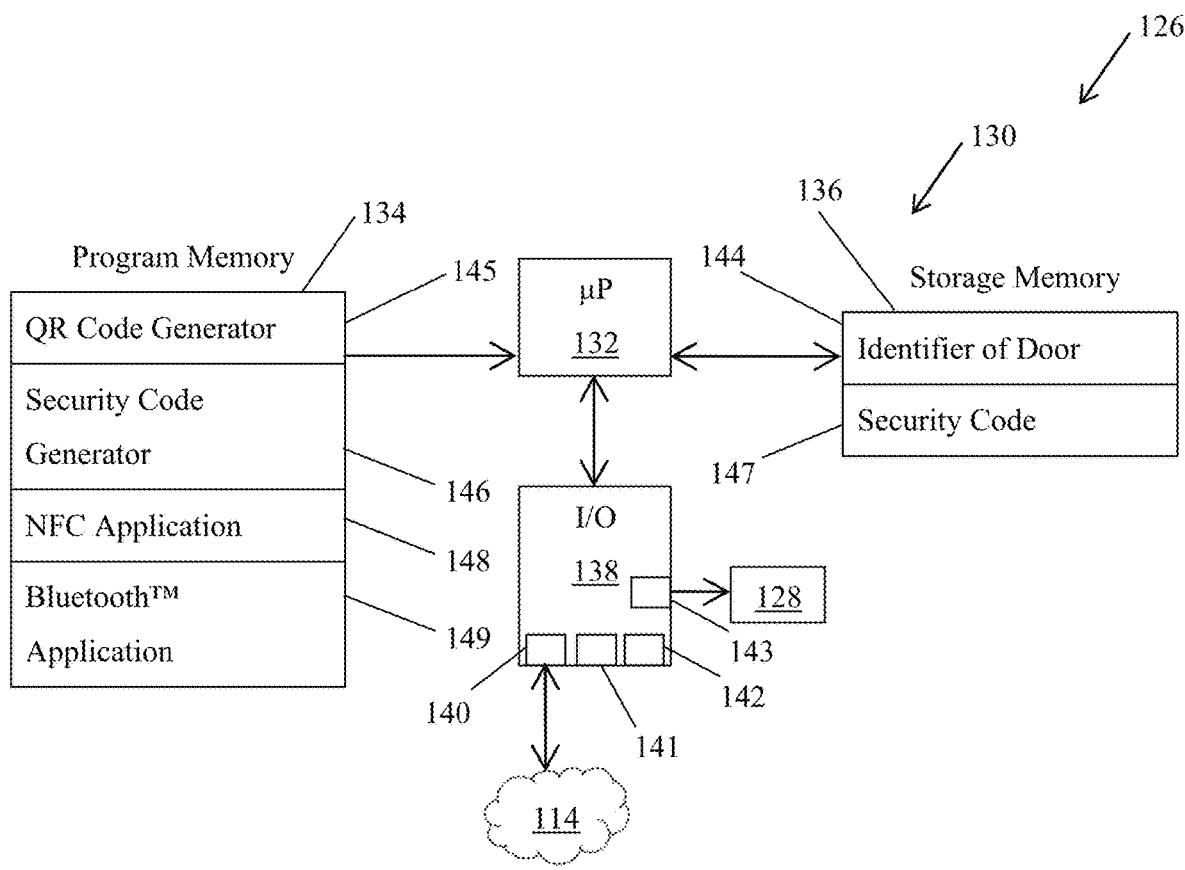
FIG. 3 schematically illustrates a processor circuit of another door indicator of the access-control system of FIG. 1.

For example, referring to FIG. 3, the door indicator 126 includes a display screen 128 and a processor circuit shown generally at 130. The processor circuit 130 includes a central processing unit (CPU) or microprocessor 132. The processor circuit 130 also includes a program memory 134, a storage memory 136, and an input/output (I/O) module 138 all in communication with the microprocessor 132. In general, the program memory 134 includes stores for storing program codes that, when executed by the microprocessor 132, cause the processor circuit 130 to implement functions of the door indicator 126 such as those described herein, for example. Further, in general, the storage memory 136 includes stores for storing storage codes as described herein, for example. The program memory 134 and the storage memory 136 may be implemented in one or more of the same or different computer-readable storage media, which in various embodiments may include one or more of a read-only memory (ROM), a random access memory (RAM), a hard disc drive (HDD), a solid-state drive (SSD), and other computer-readable and/or computer-writable storage media.

The I/O module 138 may include various signal interfaces, analog-to-digital converters (ADCs), digital-to-analog converters (DACs), receivers, transmitters, and/or other circuitry to receive, produce, and transmit signals as described herein, for example. In the embodiment shown, the I/O module 138 includes a network interface 140 operable to transmit signals to, and receive signals from, the computer network 114 (for example, using the wireless-network access point 110, or a wired or other wireless connection to the router 112, as shown in FIG. 1). The I/O module 138 also includes a near-field communication (NFC) input/output interface 141 operable to transmit NFC radio signals to, and receive NFC radio signals from, a nearby NFC device, a Bluetooth™ input/output interface 142 operable to transmit Bluetooth™ radio signals to, and receive radio Bluetooth™ signals from, a nearby Bluetooth™ device, and an output interface 143 operable to transmit signals to the display screen 128 to control a display on the display screen 128.

The storage memory 136 includes an identifier-of-door store 144 storing storage codes that identify an identifier of a door (in this example, the door 118). As indicated above, an identifier of a door as described herein may be a number, a character string, a visible door identifier, such as one or more symbols or one or more shapes, for example, or another identifier of a door.

In some embodiments, the processor circuit 130 may cause the display 128 to display such a visible door identifier. However, the program memory 134 may store QR-code-generator program codes 145 that, when executed by the microprocessor 132, may cause the processor circuit 130 to generate a QR code encoding the identifier of the door according to the storage codes stored in the identifier-of-door store 144 (for example by generating a QR code encoding a URL including the identifier of the door) and that may cause the display 128 to display the QR code.

The program memory 134 may also store security-code-generator program codes 146 that, when executed by the microprocessor 132, may cause the processor circuit 130 to generate an additional security code that may change (periodically, such as every five minutes, for example) over time (such as security code periodically generated using two-factor authentication (2FA), for example), and to store the security code in a security-code store 147 in the storage memory 136. For example, such a security code may be generated pseudorandomly according to a pseudorandom code generation function and according to an initial (or seed) code of the door indicator 126. In general, different door indicators may have the same or different initial (or seed) codes.

In such embodiments, the QR-code-generator program codes 145 may generate a QR code encoding not only the identifier of the door according to the storage codes stored in the identifier-of-door store 144, but also the security code in the security-code store 147, for example by generating a QR code encoding a URL including both the identifier of the door according to the storage codes stored in the identifier-of-door store 144 and the security code in the security-code store 147.

However, the additional security code generated by execution of the security-code-generator program codes 146 is not required, and the security-code-generator program codes 146 may be omitted from some embodiments.

The program memory 134 also includes program codes 148 of an NFC application, which, when executed by the by the microprocessor 132, may cause the processor circuit 130 to transmit data to an NFC device using one or more NFC radio signals. In some embodiments, such data may include the identifier of the door according to the storage codes stored in the identifier-of-door store 144, or may include both the identifier of the door according to the storage codes stored in the identifier-of-door store 144 and the security code according to the storage codes stored in the security-code store 147. For example, in some embodiments, such data may include a URL including both the identifier of the door according to the storage codes stored in the identifier-of-door store 144 and the security code according to the storage codes stored in the security-code store 147.

The program memory 134 also includes program codes 149 of a Bluetooth™ application, which, when executed by the by the microprocessor 132, may cause the processor circuit 130 to transmit data to a Bluetooth™ device using one or more Bluetooth™ radio signals. In some embodiments, such data may include the identifier of the door according to the storage codes stored in the identifier-of-door store 144, or may include both the identifier of the door according to the storage codes stored in the identifier-of-door store 144 and the security code according to the storage codes stored in the security-code store 147. For example, in some embodiments, such data may include a URL including both the identifier of the door according to the storage codes stored in the identifier-of-door store 144 and the security code according to the storage codes stored in the security-code store 147.

In some embodiments, the door indicator 126 may omit the display screen 128 and rely instead on transmitting signals (such as NFC signals, Bluetooth™ signals, radio signals, other electromagnetic signals, acoustic signals, or other signals as described herein, for example) to transmit data identifying at least an identifier of a door or both an identifier of a door and a security code. Such signals may travel through walls, which may permit the door indicator 126 to be behind a wall and therefore more difficult to tamper with.

In general, the door indicator 126 may indicate (by displaying a QR code or another visible door identifier such as a barcode, for example) or transmit (by transmitting data to an NFC device or to a Bluetooth™ device, for example) both an identifier of a door and a security code that may change (periodically, for example) over time. For example, the door indicator 126 may display a QR code or another visible door identifier (such as a barcode, for example) that may change over time as the security code changes, or the door indicator 126 may otherwise transmit both an identifier of a door and a security code that may change (periodically, for example) over time.

Of course QR codes, NFC, and Bluetooth™ are examples only, and alternative embodiments may display one or more other visible door identifiers and may transmit signals (such as radio signals, other electromagnetic signals, acoustic signals, or other signals) that are not necessarily NFC radio signals or Bluetooth™ radio signals. Such signals may indicate a URL including an identifier of the door as described above, or including both an identifier of the door and an additional security code as described above, or such signals may indicate at least an identifier of the door as described above, or both an identifier of the door and an additional security code as described above, in other ways.

More generally, the door indicator 126 is an example only, and alternative embodiments may differ. For example, in alternative embodiments, the I/O module 138 may include more, fewer, or different interfaces. Further, in alternative embodiments, the door indicator 126 may include different hardware, different software, or both. Such different hardware may include more than one microprocessor, one or more CPUs, one or more machine learning chips, one or more other alternatives to the microprocessor 132, discrete logic circuits, or an application-specific integrated circuit (ASIC), or combinations of one or more thereof, for example.

In summary, a door indicator as described herein may indicate at least an identifier of the door associated with the door indicator, for example by bearing or displaying the identifier of the door or by bearing or displaying an indicia (such as a QR code, for example) encoded with the identifier of the door, or a door indicator as described herein may be operable to indicate at least the identifier of the door, for example by being operable to transmit at least the identifier of the door using NFC, Bluetooth™, or some other method of transmission that may involve radio signals, other electromagnetic signals, acoustic signals, or other signals. Therefore, an identifier of a door as described herein is not limited to a number or character string, and is not limited to an identifier included in a URL encoded in a QR code, but may include any indicator that can be used to identify a door.

Of course the door indicators 124 and 126 are examples only, and alternative embodiments may include more or fewer door indicators or alternatives to the door indicators 124 and 126.

Access-Control System

Referring back to FIG. 1, the access-control system 100 includes an access-control computing system 150 that may also communicate with the computer network 114, and that may therefore communicate with the wireless-network access points 108 and 110 and more generally with one or more computing devices using the computer network 114 or the computer network 106. The access-control system 100 also includes a check-in kiosk 152 at the check-in location 104. The check-in kiosk 152 includes a touch screen 153. The check-in kiosk 152 may also function as an NFC device or as a Bluetooth™ device, or may otherwise be operable to transmit signals such as NFC signals, Bluetooth™ signals, radio signals, other electromagnetic signals, acoustic signals, or other signals as described herein, for example.

The access-control system 100 also includes a door lock 154 that may communicate with the computer network 114, for example by receiving signals from the wireless-network access point 108 or from a wired or other wireless connection to the router 112. The access-control computing system 150 may therefore control the door lock 154 by transmitting one or more signals to the door lock 154 using the computer network 114, although in other embodiments the access-control computing system 150 may alternatively control the door lock 154 in other ways. The door lock 154 may be operable to hold the door 116 in a closed position to prevent access through the doorway 120. However, the door lock 154 may also allow access through the through the doorway 120 by releasing the door 116 and allowing the door 116 to open into an open position, for example in response to receiving one or more signals from the access-control computing system 150 using the computer network 114 or otherwise. The door lock 154 may therefore function as an access control device of the door 116.

The access-control system 100 also includes a door lock 156 that may communicate with the computer network 114, for example by receiving signals from the wireless-network access point 110 or from a wired or other wireless connection to the router 112. The access-control computing system 150 may therefore control the door lock 156 by transmitting one or more signals to the door lock 156 using the computer network 114, although in other embodiments the access-control computing system 150 may alternatively control the door lock 154 in other ways. The door lock 156 may be operable to hold the door 118 in a closed position to prevent access through the doorway 122. However, the door lock 156 may also allow access through the through the doorway 122 by releasing the door 118 and allowing the door 118 to open into an open position, for example in response to receiving one or more signals from the access-control computing system 150 using the computer network 114 or otherwise. The door lock 156 may therefore function as an access control device of the door 118.

The access-control system 100 also includes a mobile computing device 158, which a may be a smartphone, a tablet computer, a smart watch, or smart glasses, for example.

Mobile Computing Device

Figure 4:
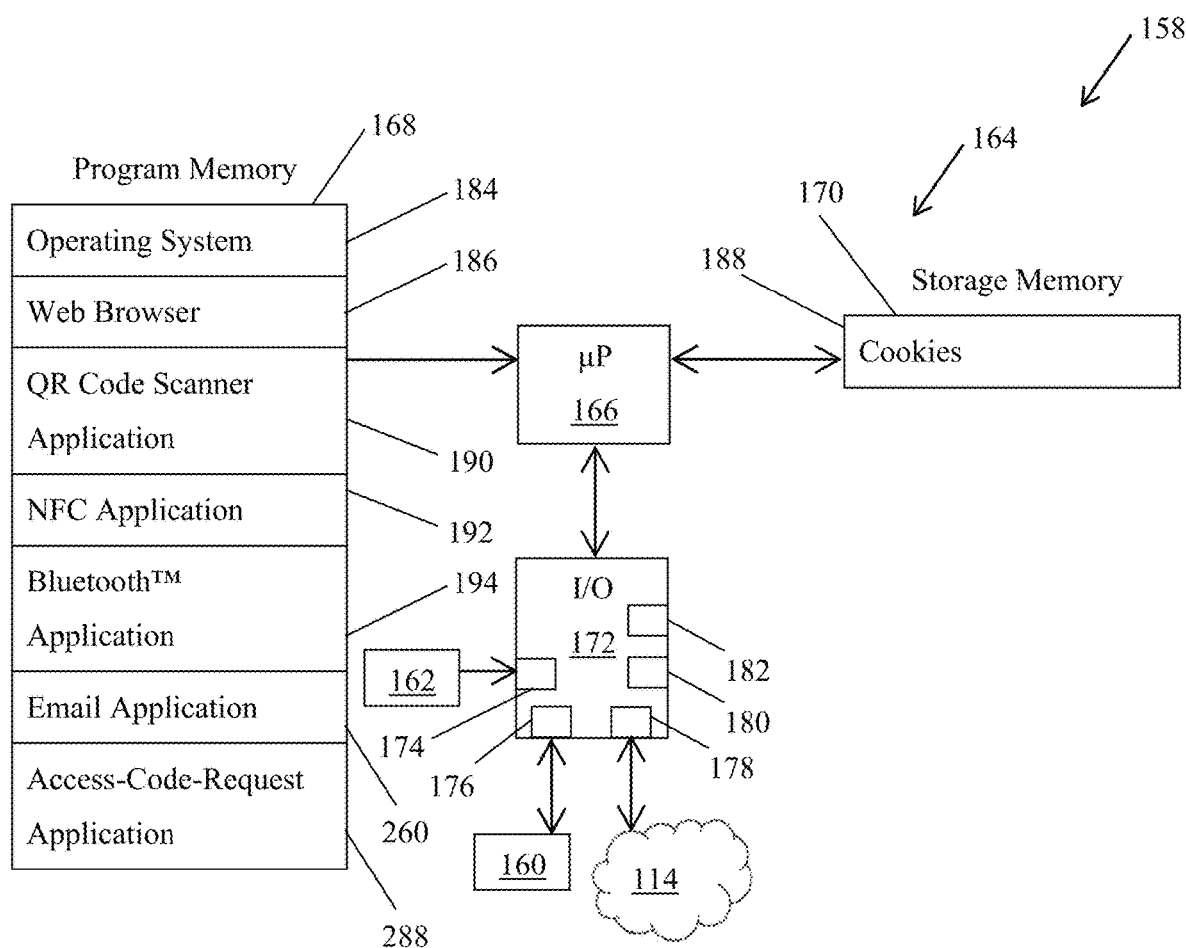
FIG. 4 schematically illustrates a processor circuit of a mobile computing device of the access-control system of FIG. 1.

Referring to FIG. 4, the mobile computing device 158 includes a touch screen 160, a camera 162, and a processor circuit shown generally at 164. The processor circuit 164 includes a CPU or microprocessor 166. The processor circuit 164 also includes a program memory 168, a storage memory 170, and an I/O module 172 all in communication with the microprocessor 166. In general, the program memory 168 includes stores for storing program codes that, when executed by the microprocessor 166, cause the processor circuit 164 to implement functions of the mobile computing device 158 such as those described herein, for example. Further, in general, the storage memory 170 includes stores for storing storage codes as described herein, for example. The program memory 168 and the storage memory 170 may be implemented in one or more of the same or different computer-readable storage media, which in various embodiments may include one or more of a ROM, RAM, HDD, SSD, and other computer-readable and/or computer-writable storage media.

The I/O module 172 may include various signal interfaces, ADCs, DACs, receivers, transmitters, and/or other circuitry to receive, produce, and transmit signals as described herein, for example. In the embodiment shown, the I/O module 172 includes an input interface 174 operable to receive signals from the camera 162 (such as signals including image data representing images from a field of view of the camera 162), an input/output interface 176 operable to transmit signals to, and receive signals from, the touch screen 160 to receive user input using the touch screen 160 and to control a display on the touch screen 160, a network interface 178 operable to transmit signals to, and receive signals from, the computer network 114, an NFC input/output interface 180 operable to transmit NFC radio signals to, and receive NFC radio signals from, a nearby NFC device (for example, the door indicator 126 or the check-in kiosk 152), and a Bluetooth™ input/output interface 182 operable to transmit Bluetooth™ radio signals to, and receive Bluetooth™ radio signals from, a nearby Bluetooth™ device (for example, the door indicator 126 or the check-in kiosk 152).

The program memory 168 includes operating system program codes 184 of an operating system. The program codes 184 may restrict use of the mobile computing device 158 to an authenticated user, for example by password, by facial recognition, using biometric data, or otherwise.

The program memory 168 also includes web-browser program codes 186, which may be program codes of a web browser such as Chrome™, Firefox™, or Safari™, for example. In general, when executed by the by the microprocessor 166, the web-browser program codes 186 cause the cause the processor circuit 164 to implement functionality of a web browser. For example, such functionality of a web browser may involve directing the web browser to a URL, which may involve transmitting one or more hypertext transfer protocol (HTTP) signals to one or more server computers identified by the URL and receiving one or more HTTP signals from the one or more server computers in response. Further, such functionality of a web browser may involve, in response to receiving one or more HTTP signals from one or more server computers, modifying a display of information on the touch screen 160, storing data (such as one or more HTTP cookies, for example), or both, for example. Such data may be stored using storage codes stored in a cookies store 188 in the storage memory 170. In general, HTTP cookies stored using storage codes stored in the cookies store 188 may be domain-specific, so that an HTTP cookie stored in response to receiving one or more HTTP signals from one or more server computers may not be accessible to other server computers.

The program memory 168 also includes program codes 190 of a QR code scanner application, which, when executed by the by the microprocessor 166, may cause the processor circuit 164 to identify and decode data from a QR code (for example, a QR code on the door indicator 124, displayed by the door indicator 126, or displayed by the check-in kiosk 152) in image data received from the camera 162. In some embodiments, such data from a QR code may include a URL, and in such embodiments, the program codes 190 of the QR code scanner application, when executed by the by the microprocessor 166, may cause the processor circuit 164 to direct the web browser of the web-browser program codes 186 to the URL.

The program memory 168 also includes program codes 192 of an NFC application, which, when executed by the by the microprocessor 166, may cause the processor circuit 164 to receive data from an NFC device (for example, the door indicator 126 or the check-in kiosk 152). In some embodiments, such data from an NFC device may include a URL, and in such embodiments, the program codes 192 of the NFC application, when executed by the by the microprocessor 166, may cause the processor circuit 164 to direct the web browser of the web-browser program codes 186 to the URL.

The program memory 168 also includes program codes 194 of a Bluetooth™ application, which, when executed by the by the microprocessor 166, may cause the processor circuit 164 to receive data from a Bluetooth™ device (for example, the door indicator 126 or the check-in kiosk 152). In some embodiments, such data from a Bluetooth™ device may include a URL, and in such embodiments, the program codes 194 of the Bluetooth™ application, when executed by the by the microprocessor 166, may cause the processor circuit 164 to direct the web browser of the web-browser program codes 186 to the URL.

The mobile computing device 158 is an example only, and alternative embodiments may differ. For example, in alternative embodiments, the I/O module 172 may include more, fewer, or different interfaces. Further, in alternative embodiments, the mobile computing device 158 may include different hardware, different software, or both. Such different hardware may include more than one microprocessor, one or more CPUs, one or more machine learning chips, one or more other alternatives to the microprocessor 166, discrete logic circuits, or an ASIC, or combinations of one or more thereof, for example.

Further, QR codes, NFC, and Bluetooth™ are examples only, and alternative embodiments may identify other visible door identifiers or may receive signals (such as radio signals, other electromagnetic signals, acoustic signals, or other signals) that are not necessarily NFC radio signals or Bluetooth™ radio signals.

Access-Control Computing System

Figures 5, 6:
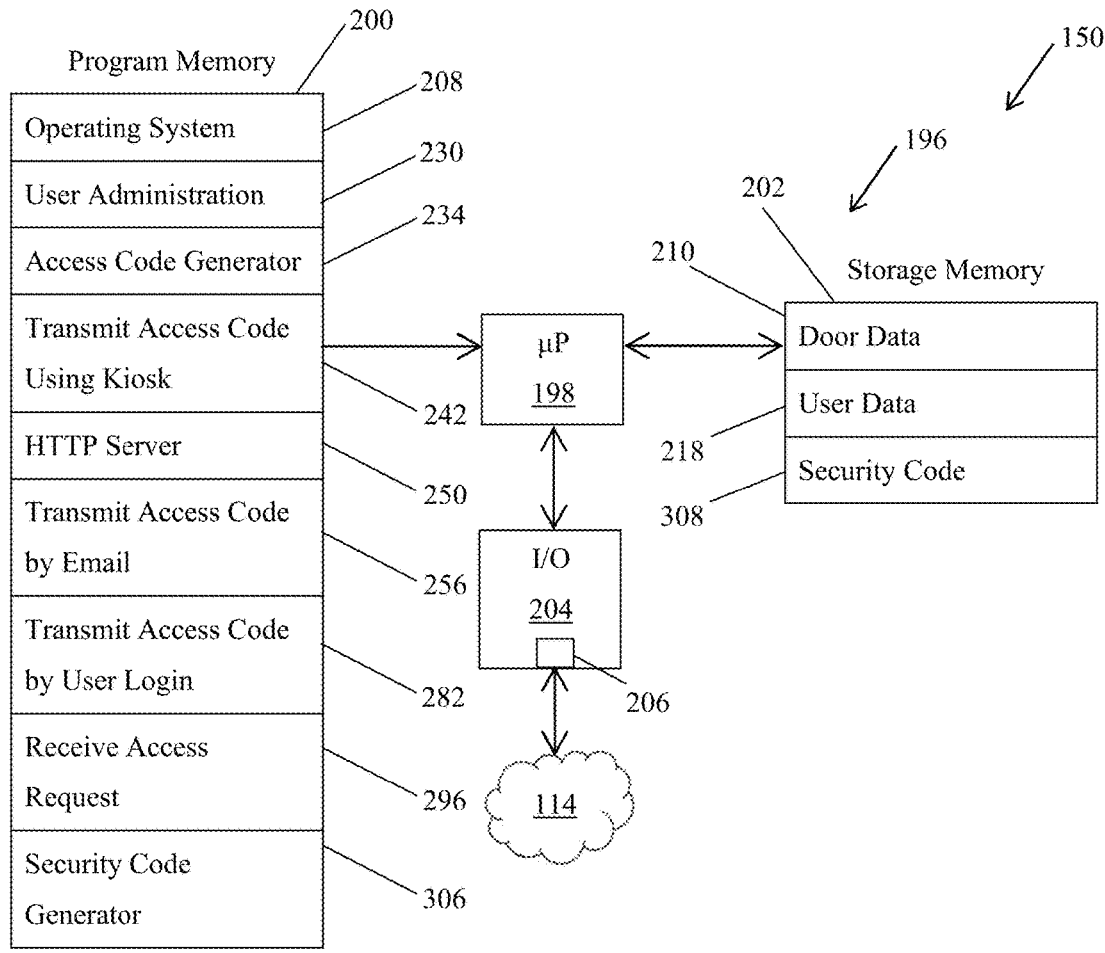
FIG. 5 schematically illustrates a processor circuit of an access-control computing system of the access-control system of FIG. 1.
FIG. 6 schematically illustrates a door-data store of a storage memory of the processor circuit of FIG. 5.

Referring to FIG. 5, the access-control computing system 150 includes a processor circuit shown generally at 196. The processor circuit 196 includes a CPU or microprocessor 198. The processor circuit 196 also includes a program memory 200, a storage memory 202, and an I/O module 204 all in communication with the microprocessor 198. In general, the program memory 200 includes stores for storing program codes that, when executed by the microprocessor 198, cause the processor circuit 196 to implement functions of the access-control computing system 150 such as those described herein, for example. Further, in general, the storage memory 202 includes stores for storing storage codes as described herein, for example. The program memory 200 and the storage memory 202 may be implemented in one or more of the same or different computer-readable storage media, which in various embodiments may include one or more of a ROM, RAM, HDD, SSD, and other computer-readable and/or computer-writable storage media.

The I/O module 204 may include various signal interfaces, ADCs, DACs, receivers, transmitters, and/or other circuitry to receive, produce, and transmit signals as described herein, for example. In the embodiment shown, the I/O module 204 includes a network interface 206 operable to transmit signals to, and receive signals from, the computer network 114.

The program memory 200 includes operating system program codes 208 of an operating system.

The storage memory 202 includes a door-data store 210 storing storage codes that identify at least one door (such as the doors 116 and 118) of at least one facility (such as the facility 102), and that associate each door of the at least one door with an identifier of the door and with at least one access control device (such as the door lock 154 or the door lock 156) of the door.

FIG. 6 illustrates an example of storage codes in the door-data store 210. As indicated above, in the embodiment of FIG. 1, the facility 102 includes the doors 116 and 118, the door indicator 124 is associated with the door 116 and indicates (or is operable to indicate) an identifier of the door 116, the door indicator 126 is associated with the door 118 and indicates (or is operable to indicate) an identifier of the door 118, the door lock 154 is an access control device of the door 116, and the door lock 156 is an access control device of the door 118.

Therefore, in the example of FIG. 6, storage codes in the door-data store 210 store (as shown in a column 212) descriptions of the doors, which may include descriptions of locations of the doors or descriptions of locations that the doors may control access to, for example.

The storage codes in the door-data store 210 also store (as shown in a column 214) identifiers of the doors. In the embodiment shown, the identifiers of the doors are eight-digit hexadecimal numbers, but identifiers may be other types of number, character strings, or any other indicators (such as one or more symbols or one or more shapes) that can be used to identify doors. The storage codes in the door-data store 210 store identifiers of the doors in association with respective doors associated with the identifiers of the doors. For example, in the example of FIG. 6, 3D5F230A is an identifier of the door 116, and the storage codes in the door-data store 210 store the identifier 3D5F230A in association with the door 116. Also, in the example of FIG. 6, 230G7B8E is an identifier of the door 118, and the storage codes in the door-data store 210 store the identifier 230G7B8E in association with the door 118.

The storage codes in the door-data store 210 also store (as shown in a column 216) identifiers of access control devices. As indicated above, in the embodiment of FIG. 1, the door lock 154 is an access control device of the door 116, and the door lock 156 is an access control device of the door 118. Also, as indicated above, the door locks 154 and 156 may communicate with the computer network 114 using the router 112. Therefore, the door locks 154 and 156 may have IP addresses, and such IP addresses may function as identifiers of the door locks 154 and 156. For example, in the example of FIG. 6, the door lock 154 has an IP address 204.25.241.87, and the storage codes in the door-data store 210 store 204.25.241.87 as an identifier of the door lock 154 in association with the door 116. Also, in the example of FIG. 6, the door lock 156 has an IP address 204.25.73.165, and the storage codes in the door-data store 210 store 204.25.73.165 as an identifier of the door lock 156 in association with the door 118. Of course alternative embodiments may differ and may, for example, include different identifiers of access control devices.

Also, as indicated above, in some embodiments, any computing devices that transmit or receive signals using the computer network 106 (for example, by using the wireless-network access point 108 or 110 shown in FIG. 1) may have external (or public) IP addresses within a range of IP addresses assigned by the router 112 (also shown in FIG. 1). For example, in the embodiment shown, the router 112 assigns external IP addresses between 204.25.0.0 and 204.25.255.255 to any computing devices that transmit or receive signals using the wireless-network access point 108 or 110, or otherwise using the router 112. The storage codes in the door-data store 210 may also store (as shown in a column 217), in association with a door, a range of IP addresses that indicate that a computing device is using a local computer network (such as the computer network 106, for example) near (or associated with) the door.

The access-control computing system 150 is an example only, and alternative embodiments may differ. For example, in alternative embodiments, the I/O module 204 may include more, fewer, or different interfaces. Further, in alternative embodiments, the access-control computing system 150 may include different hardware, different software, or both. Such different hardware may include more than one microprocessor, one or more CPUs, one or more machine learning chips, one or more other alternatives to the microprocessor 198, discrete logic circuits, or an ASIC, or combinations of one or more thereof, for example.

Authorization Data

Referring back to FIG. 5, the storage memory 202 also includes a user-data store 218 storing storage codes indicating access rights of various users. In general, "user" herein may refer to an employee, contractor, student, guest, visitor, or other person who may request access through a door (such as the door 116 or 118, for example) at a facility (such as the facility 102, for example). In the embodiment shown, the storage codes stored in the user-data store 218 represent a table including any number of instances a user-access table entry shown generally at 220 in FIG. 7. In general, the user-data table entry 220 may include various fields as described below. Each instance of the user-data table entry 220 may be associated with a respective user and can store, in such fields, particular values associated with the respective user.

Figure 7:
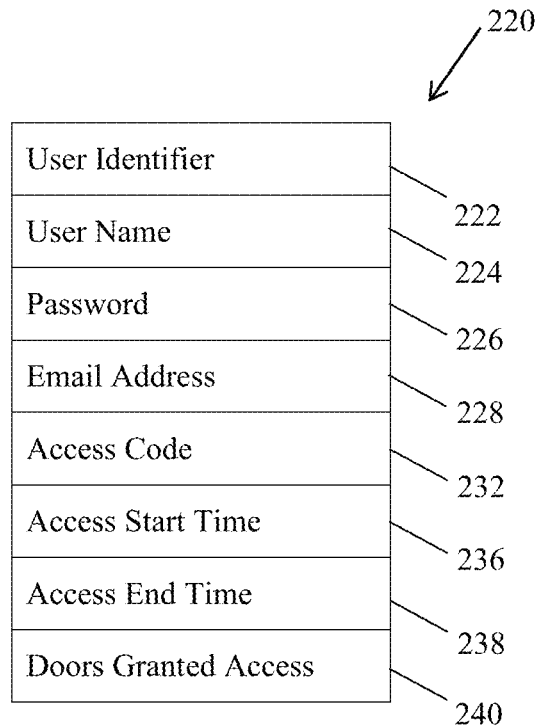
FIG. 7 schematically illustrates a user-data table entry for a user-data store of the storage memory of the processor circuit of FIG. 5.

Referring to FIG. 7, the user-data table entry 220 includes a user-identifier field 222 that may store an integer that may be assigned by database management system (DBMS) codes to identify an instance of the user-data table entry 220 uniquely in the user-data store 218 and that may identify uniquely a user associated with the instance of the user-data table entry 220. The user-data table entry 220 also includes a user-name field 224 that may store a user name of the user, a password field 226 that may store a password of the user, and an email-address field 228 that may store an email address of the user.

In general, a user may register (or be registered by another person, such as a facility administrator or another authorized person, for example) using user-administration program codes 230 in the program memory 200 (shown in FIG. 5) to create an instance of the user-data table entry 220 in the user-data store 218 and associated with the user, and the user may use the user name and password, as indicated in the user-name field 224 and the password field 226 respectively of the instance of the user-data table entry 220 associated with the user, to use services provided by the access-control computing system 150 such as those described herein, for example. Alternative embodiments may differ, and for example the user may be authenticated in other ways in other embodiments. In such other embodiments, the user-data table entry 220 may include other data that may be used for user authentication, such as biometric data, for example.

The user-data table entry 220 also includes an access-code field 232 that may store an access code. In general, an access code as described herein may be a number, character string, or other code or codes that may indicate rights of a user to gain access through one or more doors (such as the doors 116 and 118, for example) at of one or more facilities (such as the facility 102, for example). Such an access code may be generated by the access-control computing system 150. For example, the program memory 200 (shown in FIG. 5) may include access-code-generator program codes 234 that may, when executed by the microprocessor 198, cause the processor circuit 196 to generate access codes. Such access codes may be generated pseudorandomly in some embodiments to make valid access codes difficult to guess. Also, in some embodiments, such access codes may be lengthy to make valid access codes difficult to guess. Also, in some embodiments, such access codes may be unique to avoid improper reuse of access codes.

The user-data table entry 220 also includes an access-start-time field 236 that may store a start time of access granted to the user associated with an instance of the user-data table entry 220, an access-end-time field 238 that may store an end time of the access granted to the user, and a doors field 240 that may identify one or more doors that the user has been granted access to open between the start time and the end time. The doors field 240 may store one or more identifiers of doors, such as the identifiers of doors shown in the column 214 in FIG. 6, for example. In general, the user-administration program codes 230 (shown in FIG. 5) may allow a facility administrator or another authorized person to modify some or all of the fields of instances of the user-data table entry 220 to grant, vary, and remove access rights of respective users associated with the instances of the user-data table entry 220.

Obtaining an Access Code

In general, the mobile computing device 158 may obtain an access code from the access-code field 232 of an instance of the user-data table entry 220 associated with a user of the mobile computing device 158, and the mobile computing device 158 may store the access code in the cookies store 188 (shown in FIG. 4) or otherwise in the storage memory 170 (also shown in FIG. 4) of the mobile computing device 158 (or on another at least one computer-readable and/or computer-writable storage medium on or accessible to the mobile computing device 158).

For example, in some embodiments, the user of the mobile computing device 158 may enter the check-in location 104 of the facility 102 and approach the check-in kiosk 152. The user may sign in to the check-in kiosk 152, for example using the user name and password as indicated in the user-name field 224 and the password field 226 respectively of the instance of the user-data table entry 220 associated with the user. However, as indicated above, the user may be authenticated in other ways, such as using biometric data, for example. As another example, a facility administrator or another authorized person present at the check-in kiosk 152 may authenticate the user, for example by checking photo identification of the user.

When the user of the mobile computing device 158 is authenticated at the check-in kiosk 152, whether by user name and password, by biometric data, by checking photo identification, or otherwise, the check-in kiosk 152 may cause the access-control computing system 150 to transmit, to the mobile computing device 158 using the check-in kiosk 152, an access code from the access-code field 232 of an instance of the user-data table entry 220 associated with the user of the mobile computing device 158.

For example, the program memory 200 (shown in FIG. 5) may include transmit-access-code-using-kiosk program codes 242 that may, when executed by the microprocessor 198, cause the processor circuit 196 to transmit, to the check-in kiosk 152, data that will allow the mobile computing device 158 to receive the access code and to store the access code in the cookies store 188 (shown in FIG. 4) or otherwise in the storage memory 170 (also shown in FIG. 4) or on another at least one computer-readable and/or computer-writable storage medium on or accessible to the mobile computing device 158.

Figure 8:
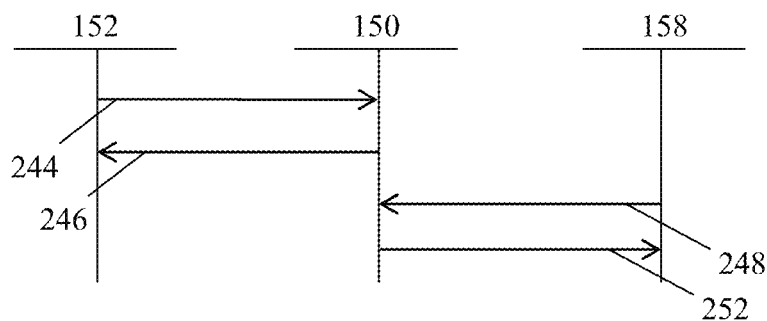
FIG. 8 schematically illustrates transmission of signals according to one embodiment.
Figure 9:
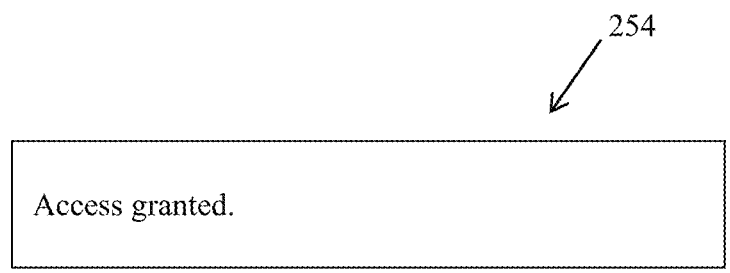
FIG. 9 schematically illustrates a webpage caused by the transmission of signals of FIG. 8.

Referring to FIG. 8 and to FIG. 9, in some embodiments, when the user of the mobile computing device 158 is authenticated at the check-in kiosk 152, whether by user name and password, by biometric data, by checking photo identification, or otherwise, the check-in kiosk 152 may transmit one or more user-authentication signals 244 to the access-control computing system 150. In response to the one or more user-authentication signals 244, the transmit-access-code-using-kiosk program codes 242 may, when executed by the microprocessor 198, cause the processor circuit 196 to transmit, to the check-in kiosk 152, one or more QR-code signals 246 that cause the touch screen 153 of the check-in kiosk 153 to display a QR code encoding a URL. The user may then position the mobile computing device 158 such that the QR code displayed by the touch screen 153 is in the field of view of the camera 162, and the program codes 190 of the QR code scanner application, when executed by the by the microprocessor 166, may cause the processor circuit 164 to identify and decode data from the QR code in image data received from the camera 162 and to direct the web browser of the web-browser program codes 186 to the URL.

Directing the web browser of the web-browser program codes 186 to such a URL may cause the web browser of the web-browser program codes 186 to transmit one or more HTTP signals 248 to an HTTP server hosted by the access-control computing system 150 according to HTTP server program codes 250 in the program memory 200 (shown in FIG. 5), and the HTTP server may respond by retrieving the access code from the access-code field 232 of the instance of the user-data table entry 220 associated with the user of the mobile computing device 158 and transmitting one or more HTTP signals 252 to the mobile computing device 158. The one or more HTTP signals 252 may cause the mobile computing device 158 to store the access code in the cookies store 188 (shown in FIG. 4), otherwise in the storage memory 170 (also shown in FIG. 4), or on another at least one computer-readable and/or computer-writable storage medium on or accessible to the mobile computing device 158, for example by causing the mobile computing device 158 to store the access code in response to causing the web browser of the web-browser program codes 186 to display a webpage shown generally at 254 in response to the one or more HTTP signals 252. In some embodiments, the URL may include or be encoded with the access code. In other embodiments, for example, the one or more HTTP signals 252 may be encoded with the access code.

In alternative embodiments, the check-in kiosk 152 may allow the mobile computing device 158 to receive the access code and to store the access code in the cookies store 188 (shown in FIG. 4), otherwise in the storage memory 170 (also shown in FIG. 4), or on another at least one computer-readable and/or computer-writable storage medium on or accessible to the mobile computing device 158, in other ways.

For example, in some embodiments, the check-in kiosk 152 may be an NFC device. In such embodiments, rather than receiving one or more QR-code signals 246, the check-in kiosk 152 may receive one or more signals that may cause the check-in kiosk 152 to transmit to the mobile computing device 158 one or more NFC signals that may direct the web browser of the web-browser program codes 186 to the URL.

As another example, in some embodiments, the check-in kiosk 152 may be a Bluetooth™ device. In such embodiments, rather than receiving one or more QR-code signals 246, the check-in kiosk 152 may receive one or more signals that may cause the check-in kiosk 152 to transmit to the mobile computing device 158 one or more Bluetooth™ signals that may direct the web browser of the web-browser program codes 186 to the URL.

Again, QR codes, NFC, and Bluetooth™ are examples only, and alternative embodiments may transmit an access code to the mobile computing device 158 and cause the mobile computing device 158 to store the access code in other ways, for example by displaying one or more other visible symbols or by transmitting signals (such as radio signals, other electromagnetic signals, acoustic signals, or other signals) that are not necessarily NFC radio signals or Bluetooth™ radio signals, and that do not necessarily involve a URL.

Figure 10:
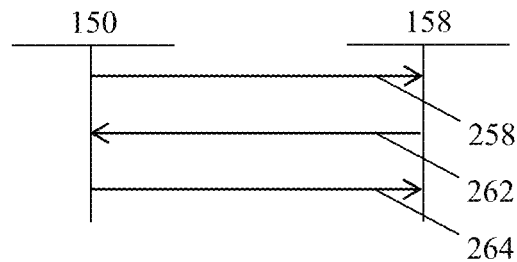
FIG. 10 schematically illustrates transmission of signals according to one embodiment.
Figure 11:
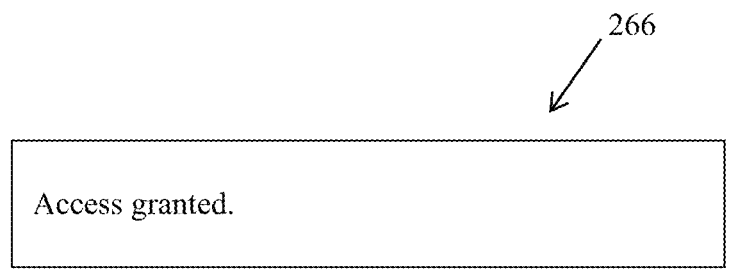
FIG. 11 schematically illustrates a webpage caused by the transmission of signals of FIG. 10.

Alternative embodiments may differ. For example, referring to FIG. 10 and to FIG. 11, in some embodiments, the program memory 200 (shown in FIG. 5) may include transmit-access-code-by-email program codes 256 that may, when executed by the microprocessor 198, cause the processor circuit 196 to transmit a URL in an email, according to one or more email signals 258, to an email address stored in the email-address field 228 of the instance of the user-data table entry 220 associated with the user of the mobile computing device 158. Email-application program codes 260 in the program memory 168 (shown in FIG. 4) may, when executed by the by the microprocessor 166, may cause the processor circuit 164 to present the URL for selection by the user, and selection of the URL by the user may direct the web browser of the web-browser program codes 186 to the URL (for example, by transmitting one or more HTTP signals 262 to the HTTP server hosted by the access-control computing system 150 according to HTTP server program codes 250 as described above, for example). As described above, for example, the HTTP server may respond by retrieving the access code from the access-code field 232 of the instance of the user-data table entry 220 associated with the user of the mobile computing device 158 and transmitting one or more HTTP signals 264 to the mobile computing device 158 that cause the mobile computing device 158 to store the access code in the cookies store 188 (shown in FIG. 4), otherwise in the storage memory 170 (also shown in FIG. 4), or on another at least one computer-readable and/or computer-writable storage medium on or accessible to the mobile computing device 158, for example by causing the mobile computing device 158 to store the access code in response to cause the web browser of the web-browser program codes 186 to display a webpage shown generally at 266 in response to the one or more HTTP signals 264.

Figure 12:
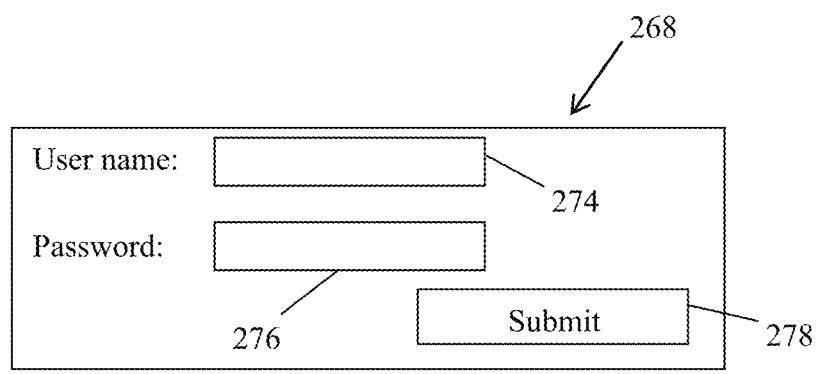
FIG. 12 schematically illustrates a webpage caused by transmission of signals according to one embodiment.
Figure 13:
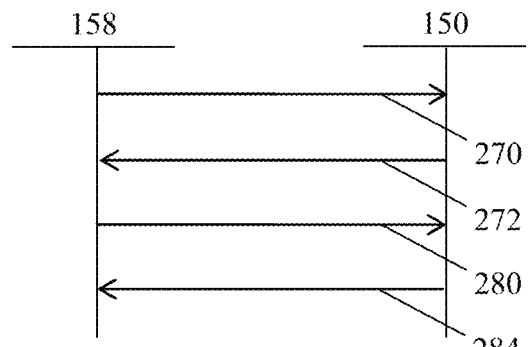
FIG. 13 schematically illustrates the transmission of signals of FIG. 12.
Figure 14:
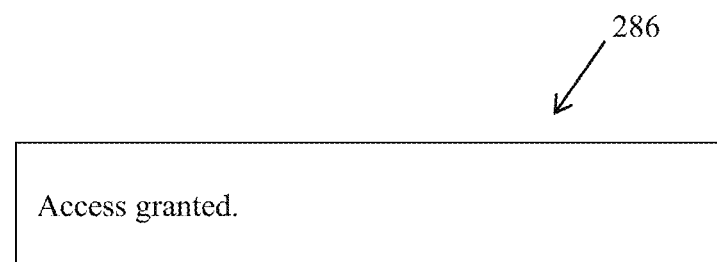
FIG. 14 schematically illustrates another webpage caused by the transmission of signals of FIG. 13.

As another example, referring to FIG. 12, to FIG. 13, and to FIG. 14, in some embodiments, the user of the mobile computing device 158 may use the web browser of the web-browser program codes 186 to access a webpage shown generally at 268 by directing the web browser of the web-browser program codes 186 to a URL of the webpage 268. Directing the web browser of the web-browser program codes 186 to the URL of the webpage 268 causes the web browser to transmit one or more HTTP signals 270 including the URL to the access-control computing system 150. In response to the one or more HTTP signals 270, the HTTP server hosted by the access-control computing system 150 according to HTTP server program codes 250 returns one or more HTTP signals 272 to the mobile computing device 158, the one or more HTTP signals 272 including data (using hypertext markup language (HTML), for example) to cause the web browser of the web-browser program codes 186 to display the webpage 268.

In the example of FIG. 12, the webpage 268 includes a user-name field 274 for the user to enter a user name, and a password field 276 for the user to enter a password. The user can then select a submit button 278 on the webpage 268. User selection of the submit button 278 may cause the web browser to transmit one or more HTTP signals 280, including the user name in the user-name field 274 and the password in the password field 276, to the access-control computing system 150. In response to the one or more HTTP signals 280, transmit-access-code-by-user-login program codes 282 in the program memory 200 (shown in FIG. 5) may be executed by the microprocessor 198 to cause the processor circuit 196 to determine whether the user name in the user-name field 274 matches a user name in the user-name field 224 in an instance of the user-data table entry 220, and (if so) whether the password in the password field 276 matches the password in the password field 226 in the same instance of the user-data table entry 220.

If the user name in the user-name field 274 matches a user name in the user-name field 224 in an instance of the user-data table entry 220, and if the password in the password field 276 matches the password in the password field 226 in the same instance of the user-data table entry 220, then the transmit-access-code-by-user-login program codes 282, when executed by the microprocessor 198, cause the HTTP server hosted by the access-control computing system 150 according to HTTP server program codes 250 to transmit one or more HTTP signals 284 to the mobile computing device 158 that cause the mobile computing device 158 to store the access code in the cookies store 188 (shown in FIG. 4), otherwise in the storage memory 170 (also shown in FIG. 4), or on another at least one computer-readable and/or computer-writable storage medium on or accessible to the mobile computing device 158, for example by causing the mobile computing device 158 to store the access code in response to cause the web browser of the web-browser program codes 186 to display a webpage shown generally at 286 in response to the one or more HTTP signals 284.

Figure 15:
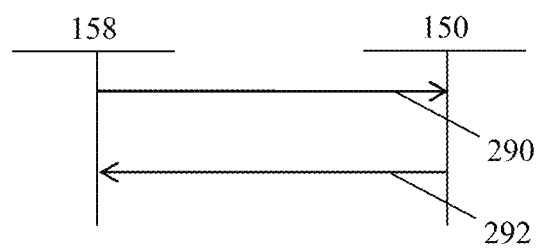
FIG. 15 schematically illustrates transmission of signals according to one embodiment.

As another example, referring to FIG. 15, in some embodiments, the program memory 168 (shown in FIG. 4) also includes program codes 288 of an access-code-request application, which, when executed by the by the microprocessor 166, may cause the processor circuit 164 to receive a user name and password from the user (for example, using a user interface similar to the webpage 268 shown in FIG. 12) and to transmit one or more signals 290, including the user name and the password, to the access-control computing system 150. In response to the one or more signals 290, the transmit-access-code-by-user-login program codes 282 may, as described above for example, be executed by the microprocessor 198 to cause the processor circuit 196 to determine whether the user name in the one or more signals 290 matches a user name in the user-name field 224 in an instance of the user-data table entry 220, and (if so) whether the password in the one or more signals 290 matches the password in the password field 226 in the same instance of the user-data table entry 220.

If the user name in the one or more signals 290 matches a user name in the user-name field 224 in an instance of the user-data table entry 220, and if the password in the one or more signals 290 matches the password in the password field 226 in the same instance of the user-data table entry 220, then the transmit-access-code-by-user-login program codes 282, when executed by the microprocessor 198, cause the processor circuit 196 to transmit one or more signals 292 to the mobile computing device 158 that cause the mobile computing device 158 to store the access code in the cookies store 188 (shown in FIG. 4), otherwise in the storage memory 170 (also shown in FIG. 4), or on another at least one computer-readable and/or computer-writable storage medium on or accessible to the mobile computing device 158.

In other words, the program codes 288, when executed by the by the microprocessor 166, may allow a user to obtain an access code by logging similarly to logging in using the webpage 268 (shown in FIG. 12), although the program codes 288 are program codes of the access-code-request application, which may be restricted to send a user name and password only to the access-control computing system 150 or to one or more other specified URLs, IP addresses, or server applications. In some embodiments, the transmit-access-code-by-user-login program codes 282 may transmit an access code only to the application of the program codes 288.

Because the access-code-request application may be restricted to send a user name and password only to the access-control computing system 150 or to one or more other specified URLs, IP addresses, or server applications, requiring a user name and password to be sent using the access-code-request application may prevent fraudulently obtaining user names and passwords. Therefore, in some embodiments, an attempt to access a login webpage (such as the webpage 268, for example) may direct the mobile computing device 158 automatically (using deep linking, for example) to a specific application such as the access-code-request application of the program codes 288, for example.

Access Requests

As indicated above, a user of the mobile computing device 158 may be a person who may request access through a door (such as the door 116 or 118, for example) at a facility (such as the facility 102, for example). The access code stored in the cookies store 188 (shown in FIG. 4), otherwise in the storage memory 170 (also shown in FIG. 4), or on another at least one computer-readable and/or computer-writable storage medium on or accessible to the mobile computing device 158 may allow the user to request and obtain access through a door (such as the door 116 or 118, for example) by causing the mobile computing device 158 to transmit one or more access-request signals to the access-control computing system 150.

For example, as indicated above, in some embodiments, the door indicator 124 may bear or display a QR code (shown in FIG. 2) that may be encoded with a URL including an identifier of the door associated with the door indicator. Also, as indicated above, the door indicator 126 may indicate or transmit both an identifier of a door and a security code that may change (periodically, for example) over time.

The user may approach the door 116 and then position the mobile computing device 158 such that a QR code on the door indicator 124 is in the field of view of the camera 162. Alternatively, the user may approach the door 118. Then the user may position the mobile computing device 158 such that a QR code or other visual indicator on the door indicator 126 is in the field of view of the camera 162. Alternatively, the user may position the mobile computing device 158 near the door indicator 126 and receive data from the door indicator 126 using NFC or Bluetooth™ or otherwise using radio signals, other electromagnetic signals, acoustic signals, or other signals, for example. As a result, the mobile computing device 158 may receive an identifier of a door from the door indicator 124 or from the door indicator 126, or the mobile computing device 158 may receive both an identifier of a door and a security code from the door indicator 126.

For example, a QR code on the door indicator 124 or 126 may be encoded with a URL, and the program codes 190 of the QR code scanner application, when executed by the by the microprocessor 166, may cause the processor circuit 164 to identify and decode data from the QR code in image data received from the camera 162 and to direct the web browser of the web-browser program codes 186 to a URL encoded in the QR code. Alternatively, one or more NFC radio signals received by the mobile computing device 158 may be encoded with a URL, and the program codes 192 of the NFC application, when executed by the by the microprocessor 166, may cause the processor circuit 164 to direct the web browser of the web-browser program codes 186 to the URL. Alternatively, one or more Bluetooth™ radio signals received by the mobile computing device 158 using Bluetooth™ may be encoded with a URL, and the program codes 194 of the Bluetooth™ application, when executed by the by the microprocessor 166, may cause the processor circuit 164 to direct the web browser of the web-browser program codes 186 to the URL.

Figure 16:
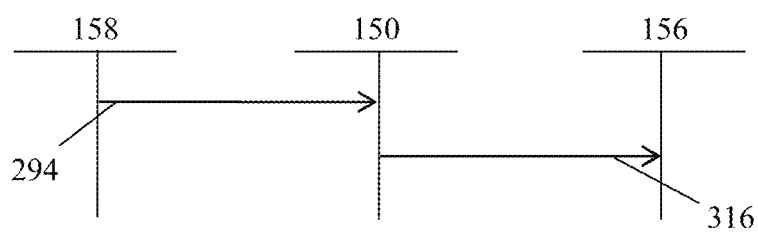
FIG. 16 schematically illustrates transmission of signals according to one embodiment.

Referring to FIG. 16, directing the web browser of the web-browser program codes 186 to the URL may cause the web browser of the web-browser program codes 186 to transmit one or more HTTP signals 294 to the HTTP server hosted by the access-control computing system 150 according to HTTP server program codes 250 in the program memory 200 (shown in FIG. 5), and the one or more HTTP signals 294 may include the access code stored in the cookies store 188 (shown in FIG. 4), otherwise in the storage memory 170 (also shown in FIG. 4), or on another at least one computer-readable and/or computer-writable storage medium on or accessible to the mobile computing device 158.

In response to the one or more HTTP signals 294, the HTTP server may cause the microprocessor 198 to execute receive-access-request program codes 296 in the program memory 200. In general, the receive-access-request program codes 296 include blocks of program codes that, when executed by the microprocessor 198, may cause the processor circuit 196 to determine whether to allow access through a door in response to the one or more HTTP signals 294 (or one or more other access-request signals). The one or more HTTP signals 294 are therefore an access request.

Figure 17:
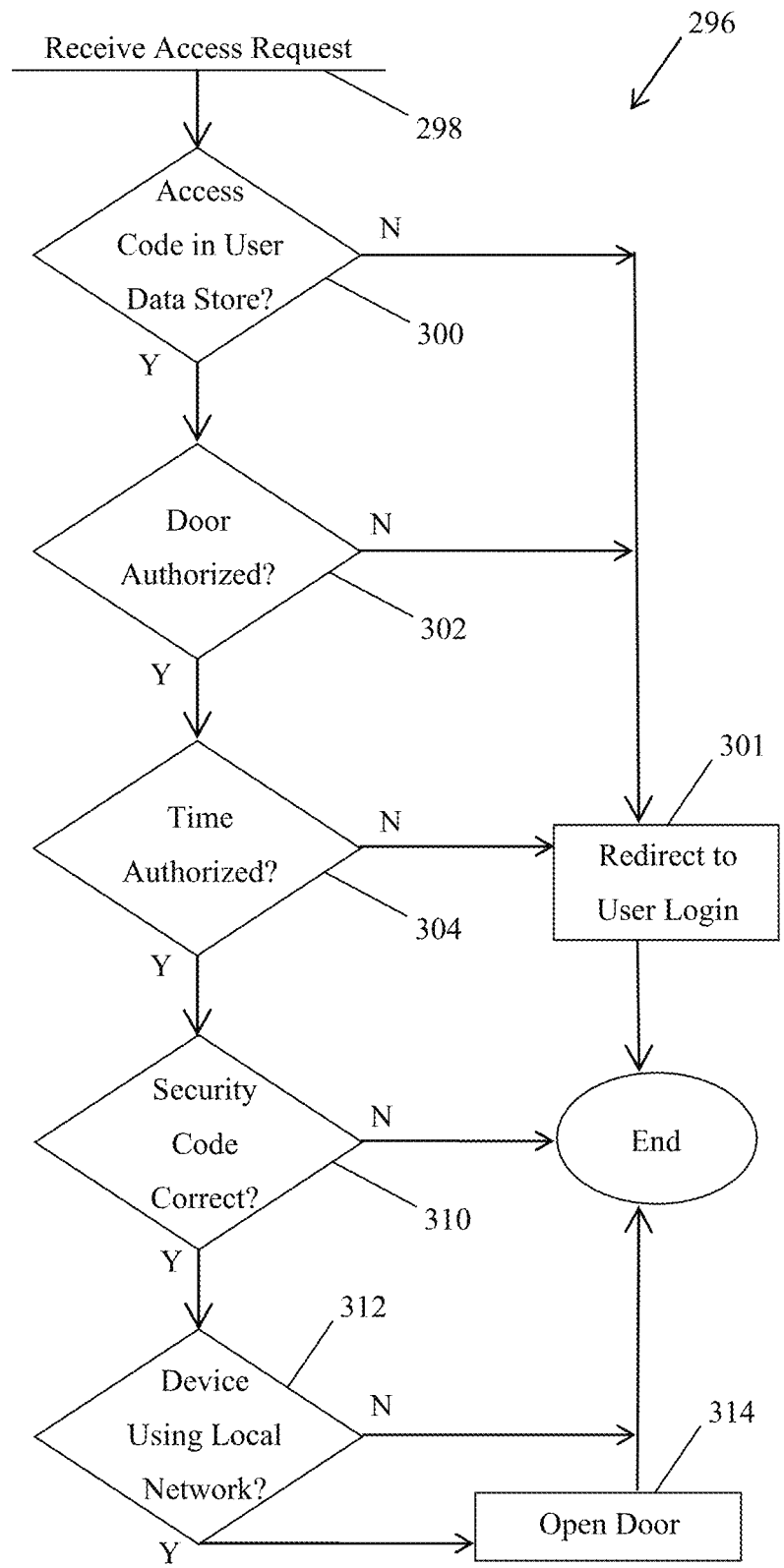
FIG. 17 schematically illustrates receive-access-request program codes of a program memory of the processor circuit of FIG. 5.

Referring to FIG. 17, the receive-access-request program codes 296 begin at 298 in response to receiving the one or more HTTP signals 294. The receive-access-request program codes 296 may then continue at block 300, which includes program codes that, when executed by the microprocessor 198, may cause the processor circuit 196 to determine whether the access code included in the one or more HTTP signals 294 matches an access code in the access-code field 232 of an instance of the user-data table entry 220 in the user-data store 218.

If at block 300 the access code included in the one or more HTTP signals 294 does not match an access code in the access-code field 232 of an instance of the user-data table entry 220 in the user-data store 218, then the mobile computing device 158 does not have a valid access code, and the receive-access-request program codes 296 may continue at block 301, which includes program codes that, when executed by the microprocessor 198, may cause the processor circuit 196 to transmit one or more HTTP signals to the mobile computing device 158 that redirect the web browser of the web-browser program codes 186 to the webpage 268 (shown in FIG. 12) to allow the user of the mobile computing device 158 to obtain an access code or an updated access code Alternatively, the program codes at block 301, when executed by the microprocessor 198, may cause the processor circuit 196 to transmit one or more HTTP signals to the mobile computing device 158 that direct the mobile computing device 158 automatically (using deep linking, for example) to a specific application such as the access-code-request application of the program codes 288, for example. As indicated above, such a specific application may be restricted to send a user name and password only to the access-control computing system 150 or to one or more other specified URLs, IP addresses, or server applications, which may prevent fraudulently obtaining user names and passwords.

The receive-access-request program codes 296 may end after block 301.

However, if at block 300 the access code included in the one or more HTTP signals 294 matches an access code in the access-code field 232 of an instance of the user-data table entry 220 in the user-data store 218, then the receive-access-request program codes 296 may continue at block 302, which includes program codes that, when executed by the microprocessor 198, may cause the processor circuit 196 to determine whether the doors field 240 in the instance of the user-data table entry 220 identified at block 300 includes the identifier of the door included in the one or more HTTP signals 294. If at block 302 the doors field 240 in the instance of the user-data table entry 220 identified at block 300 does not include the identifier of the door included in the one or more HTTP signals 294, then the access code included in the one or more HTTP signals 294 does not include access through the door identified by the identifier of the door included in the one or more HTTP signals 294, and the receive-access-request program codes 296 may continue at block 301 as described above.

However, if at block 302 the doors field 240 in the instance of the user-data table entry 220 identified at block 300 includes the identifier of the door included in the one or more HTTP signals 294, then the receive-access-request program codes 296 may continue at block 304, which includes program codes that, when executed by the microprocessor 198, may cause the processor circuit 196 to determine whether the current time is within a time range between (1) the access start time identified in the access-start-time field 236 in the instance of the user-data table entry 220 identified at block 300 and (2) the access end time identified in the access-end-time field 238 in the instance of the user-data table entry 220 identified at block 300. If at block 304 the current time is not within the time range between the access start time and the access end time, then the access code included in the one or more HTTP signals 294 does not include current access, and the receive-access-request program codes 296 may continue at block 301 as described above.

As indicated above, as shown in FIG. 3, the program memory 134 may store security-code-generator program codes 146 that, when executed by the microprocessor 132, may cause the processor circuit 130 to generate a security code that may change (periodically, for example) over time (such as security code periodically generated using 2FA, for example). Likewise, as shown in FIG. 5, the program memory 200 may store security-code-generator program codes 306 that, when executed by the microprocessor 198, may cause the processor circuit 196 to generate a security code (for example, pseudorandomly according to a same pseudorandom code generation function as the security-code-generator program codes 146 and according to a same initial (or seed) code of the door indicator 126) that may change (periodically, for example) over time and that may be synchronized to match the security code generated by execution of the security-code-generator program codes 146 over time, and to store the security code in a security-code store 308 in the storage memory 202.

As indicated above, security codes as described above may be generated pseudorandomly according to an initial (or seed) code, and different door indicators may have a common initial (or seed) code or different initial (or seed) codes. Therefore, in embodiments in which different door indicators have a common initial (or seed) code, the security-code-generator program codes 306 may, when executed by the microprocessor 198, cause the processor circuit 196 to generate a single security code at any one time based on the common initial (or seed) code of the door indicators. However, in embodiments in which different door indicators have different initial (or seed) codes, the security-code-generator program codes 306 may, when executed by the microprocessor 198, cause the processor circuit 196 to generate multiple security codes at any one time, each based on a respective one of the initial (or seed) codes of the door indicators.

Therefore, if at block 304 the current time is within the time range between the access start time and the access end time, then the receive-access-request program codes 296 may continue at block 310, which includes program codes that, when executed by the microprocessor 198, may cause the processor circuit 196 to determine whether a security code included in the one or more HTTP signals 294 matches the current security code in the security-code store 308. If at block 310 the security code included in the one or more HTTP signals 294 does not match the current security code in the security-code store 308, then the user of the mobile computing device 158 may be attempting to gain access through a door using an old QR code or other old data from a door indicator such as the door indicator 126, and the receive-access-request program codes 296 may end.

As indicated above, any computing devices that transmit or receive signals using the computer network 106 (shown in FIG. 1) may be identifiable as computing devices using the computer network 106 according to their IP addresses external to the computer network 106. Therefore, if at block 310 the security code included in the one or more HTTP signals 294 matches the current security code in the security-code store 308, then the receive-access-request program codes 296 may continue at block 312, which includes program codes that, when executed by the microprocessor 198, may cause the processor circuit 196 to determine whether an IP address from which the one or more HTTP signals 294 were sent is within a range of IP addresses associated with the door identified by the identifier of the door included in the one or more HTTP signals 294 according to the storage codes in the door-data store 210. If at block 312 the IP address from which the one or more HTTP signals 294 were sent is not within the range of IP addresses associated with the door, then the user of the mobile computing device 158 may be attempting to gain access through a door from a location away from the door, and the receive-access-request program codes 296 may end.

However, if at block 312 the IP address from which the one or more HTTP signals 294 were sent is within the range of IP addresses associated with the door, then the receive-access-request program codes 296 may continue at block 314, which includes program codes that, when executed by the microprocessor 198, may cause the processor circuit 196 to allow access through the door identified by the identifier of the door included in the one or more HTTP signals 294. For example, an IP address of an access control device of the door may be associated with the door according to the storage codes in the door-data store 210, and the program codes at block 314 may include program codes that, when executed by the microprocessor 198, cause the processor circuit 196 to transmit one or more signals 316 (shown in FIG. 16) to the access control device of the door may be associated with the door according to the storage codes in the door-data store 210 (such as the door lock 156 shown in FIG. 1, for example).

In some embodiments, the program codes at block 314 may include program codes that, when executed by the microprocessor 198, cause the processor circuit 196 to record a log of the time and date of the access request, the door that was accessed, and the access code that was used in the access request.

The receive-access-request program codes 296 may end after block 314.

In the embodiment described above, the one or more HTTP signals 294 are one or more access-request signals. However, in alternative embodiments, one or more access-request signals may not necessarily be one or more HTTP signals but rather could be one or more other types of signals. In general, the one or more HTTP signals 294 or one or more other types of signals may function as an access request.

For example, another application (such as the access-code-request application of the program codes 288, for example) may receive an identifier of the door (by decoding a QR code, using another visible door identifier, or using one or more signals such as NFC signals, Bluetooth™ signals, radio signals, other electromagnetic signals, or acoustic signals, for example) and submit an one or more access-request signals as an alternative to the one or more HTTP signals 294.

More generally, the receive-access-request program codes 296 are an example only, and alternative embodiments may differ. For example, some embodiments may omit security codes as described above, in which case the program codes at block 310 may be omitted. As another example, some embodiments may not determine whether an IP address from which the one or more HTTP signals 294 were sent is within a range of IP addresses, in which case the program codes at block 312 may be omitted. More generally, alternative embodiments may include fewer, different, or additional determinations.

For example, in addition to or in the alternative to the determination at block 312, the receive-access-request program codes 296 may determine whether Global Positioning System (GPS) position data or other position data of the mobile computing device 158 indicate that the mobile computing device 158 is within an acceptable range from the door identified by the identifier of the door included in the one or more HTTP signals 294. Such position data may also be included in the one or more HTTP signals 294.

Further, in the embodiment shown, the access-control computing system 150 is outside of the computer network 106 of the facility 102. However, in other embodiments, an access-control computing system 150 may be within a local computer network (such as a LAN, for example) and only accessible by mobile computing devices that are also within the same local computer network, which may prevent access requests from computing devices outside of the local computer network.

CONCLUSION

In general, embodiments such as those described above may facilitate control of access by users through doors (such as the door 116 or 118, for example) at a facility (such as the facility 102, for example).

For example, in embodiments such as those described above, a mobile computing device (such as the mobile computing device 158, for example) may store an access code that may be associated with access rights of a user. As described above, for example, the mobile computing device may transmit the access code and an identifier of a door, and an access-control computing system (such as the access-control computing system 150, for example) may determine whether the access code is associated with access rights through the door. In other words, embodiments such as those described herein may replace access cards such as radio-frequency identification (RFID) cards, for example.

Use of mobile computing devices (such as the mobile computing device 158, for example) may be restricted by password, by facial recognition, using biometric data, or otherwise. Therefore, alternatives such as those described above may be more secure than access cards such as RFID cards because a misplaced access card may easily be used by an unauthorized person who finds the misplaced access card, whereas use of a misplaced mobile computing device may be restricted to an authenticated user, for example by password, by facial recognition, using biometric data, or otherwise.

Further, as indicated above, access requests may be restricted (at block 312 shown in FIG. 17, for example) to a local computer network, and such a local computer network may require a password or other authentication. Therefore, requiring authentication for a local computer network may prevent access requests from computing devices that have not separately obtained authorization to use the local computer network.

Further, as indicated above, HTTP cookies stored using storage codes stored in the cookies store 188 may be domain-specific, so that an HTTP cookie stored in response to receiving one or more HTTP signals from one or more server computers may not be accessible to other server computers. Therefore, in some embodiments, storing access codes as HTTP cookies as described above may prevent other server computers from accessing the access codes.

Further, embodiments such as those described above may avoid time or cost required to administer access cards such as RFID cards, and may facilitate control of access by users through doors while allowing the users to use a standard web browser rather than having to download a specific application to their mobile computing devices.

However, as indicated above, a specific application (such as the access-code-request application of the program codes 288, for example) may be restricted to send a user name and password only to the access-control computing system 150 or to one or more other specified URLs, IP addresses, or server applications. Therefore, some embodiments may include such a specific application potentially to prevent fraudulently obtaining user names and passwords, and some embodiments may include combined functionality of both a web browser (such as the web browser of the web-browser program codes 186, for example) and such a specific application for potentially greater security.

Although specific embodiments have been described and illustrated, such embodiments should be considered illustrative only and not as limiting the invention as construed according to the accompanying claims.

The invention claimed is:

1. A method of requesting access through a door by a mobile computing device, the method comprising:
    receiving a Uniform Resource Locator (URL);
    directing a web browser application of the mobile computing device to a webpage based on the received URL;
    receiving an access code from an access-control system, the access code associated with an identifier of the door; and
    transmitting an access request to the access-control system, the access request comprising data representing at least the identifier of the door and the access code.

2. The method of claim 1, the URL being a first URL, the method further comprising receiving a second URL, the second URL encoding the identifier of the door, wherein transmitting the access request comprises:
    directing the web browser application of the mobile computing device to a second webpage based on the second URL; and
    transmitting the access code to the access-control system.

3. The method of claim 2 wherein receiving the second URL comprises optically scanning a visible door identifier of the door.

4. The method of claim 3 wherein the visible door identifier of the door comprises a Quick Response (QR) code.

5. The method of claim 2 further comprising storing the access code in a memory of the mobile computing device.

6. The method of claim 5 wherein the access code is stored in an HTTP cookie.

7. The method of claim 6, wherein transmitting the access code to the access-control system comprises identifying the HTTP cookie where the access code is stored; and transmitting the HTTP cookie to the access-control system.

8. The method of claim 5 wherein the access code is received while the mobile computing device is directed to a first webpage.

9. The method of claim 2 wherein transmitting the access code to the access-control system comprises transmitting at least one hypertext transfer protocol (HTTP) cookie.

10. An access-control computing system comprising:
    at least one processor; and
    at least one processor-readable storage device comprising stored thereon processor-executable instructions that, when executed by the at least one processor, cause the system to:
    transmit a Uniform Resource Locator (URL) operable to direct a web browser application of a mobile computing device to a webpage;
    in response to being reached at the URL by the web browser application of the mobile computing device, transmit an access code to the mobile computing device, the access code associated with an identifier of a door;
    receive an access request from the mobile computing device, the access request comprising data representing at least the identifier of the door and the access code; and
    in response to the request, allow access through the door.

11. The system of claim 10, wherein the URL is a first URL, and wherein the system is caused to receive the access request by being reached at a second URL by the web browser application of the mobile computing device, the second URL encoding the identifier of the door.

12. The system of claim 11 wherein the access code received in the access request is included in at least one hypertext transfer protocol (HTTP) cookie.

13. The system of claim 11 wherein the system is caused to transmit the first URL by causing a check-in kiosk to transmit the first URL to the mobile computing device.

14. The system of claim 10 wherein the system is caused to allow access through the door by allowing access through the door in response to a determination that the mobile computing device uses a local computer network associated with the door to transmit the access request.

15. The system of claim 10, wherein the system stores a user-data table store each entry of which is associated with a respective user, wherein the entry includes a time range that defines an access start time and an access end time, and the system is further caused to
    determine if an access time indicated in the access request is within the time range;
    in response to the access time being within the time range, allow access through the door.

16. The system of claim 10 wherein the system is caused to transmit the access code to the mobile computing device by transmitting the access code to the mobile computing device in response to user authentication on the mobile computing device.

17. The system of claim 10 wherein the system is caused to transmit the access code to the mobile computing device by transmitting the access code to the mobile computing device in response to user authentication on the mobile computing device using an application that is restricted to sending requests for access codes to the access-control computing system.

18. The system of claim 10 wherein the system is caused to allow access through the door by allowing access through the door in response to a determination that the access code received in the access request corresponds to the identifier of the door.

19. The system of claim 10 wherein the access request further comprises data representing a security code, and the system is caused to allow access through the door by allowing access through the door in response to a determination that the security code from the access request matches a security code that is generated by the access-control computing system, wherein the security code generated by the access-control computing system changes over time according to a pseudorandom code generation function.

20. The system of claim 10, wherein the system stores a user-data table store each entry of which is associated with a respective user, where the entry includes the access code associated with the mobile computer device of the user,
    wherein the system is caused to transmit the access code to the mobile computing device by retrieving the access code from the entry associated with the user and transmitting the retrieved access code to the mobile computing device in at least one HTTP signal.

21. A method of controlling access through a door, the method comprising:
    transmitting a Uniform Resource Locator (URL) operable to direct a web browser application of a mobile computing device to a webpage;
    in response to being reached at the URL by the web browser application of the mobile computing device, transmitting an access code to the mobile computing device, the access code associated with an identifier of a door;

receiving an access request from the mobile computing device, the access request comprising data representing at least the identifier of the door and access code; and in response to the request, allowing access through the door.

22. The method of claim 21, wherein the URL is a first URL, and wherein receiving the access request comprises being reached at a second URL by the web browser application of the mobile computing device, the second URL encoding the identifier of the door.

23. The method of claim 22 wherein the access code is stored in at least one hypertext transfer protocol (HTTP) cookie that is included in the access request.

\* \* \* \* \*